Oct. 5, 1937.  S. KIESSKALT ET AL  2,094,844
APPARATUS FOR PURIFYING GASES
Filed Aug. 14, 1935

Patented Oct. 5, 1937

2,094,844

UNITED STATES PATENT OFFICE 2,094,844

APPARATUS FOR PURIFYING GASES

Siegfried Kiesskalt, Frankfort-on-the-Main, and Walther Mejer, Bad Soden, Germany, assignors to I. G. Farbenindustrie Aktiengesellschaft, Frankfort-on-the-Main, Germany Application August 14, 1935, Serial No. 36,184
In Germany August 22, 1934

3 Claims. (Cl. 183—9)

The present invention relates to an apparatus for purifying flowing gases.

Gases have been purified or freed from dust by passing them through layers of material which are wetted with suitable liquids. The cleaning action of these methods is good only when in the working plant care is taken to remove manually or automatically the dirty layers, and to replace them after they have been cleaned and wetted again. A known arrangement consists for instance in an endless paternoster-like plate-conveyor, the several frames of which pass periodically through a trough containing a liquid by which they are cleaned and wetted again.

Now we have found that gases can be purified in a particularly advantageous manner by passing them through a container charged with filling bodies and caused to oscillate in a frequency of about 300 to 4000 oscillations per minute and an amplitude up to 2–5 millimeters; in such a manner that the bodies are caused to move in a path in the course of which they alternately pass through the current of gas and the wetting liquid contained in the bottom part of the container. The oscillating motion produces a circulating motion of the bodies whereby they leave the zone in which they are in contact with the gases to be purified and enter the wetting liquid where they are freed from the adhering impurities, and are charged with new wetting liquid; they then re-enter the zone of contact with the gas.

For carrying out the method filling bodies of any kind, such as Raschig rings, spherical filling bodies and the like, are suitable. The method is applicable in all cases where gases are caused to pass, in the presence of stationary or trickling liquids, through layers of filling bodies, for instance in towers or similar arrangements, and where an automatic cleaning and a uniform rewetting of the filling bodies, while avoiding the formation of channels, are of importance. Moreover, the method may also be applied for scrubbing gases which are in themselves free from dust and from which individual constituents have to be removed by means of the wetting liquid either physically or chemically and in the latter case even with formation of solid products. By this method the impurities or reaction products are automatically removed in a continous manner without formation of incrustations, and in some cases where the application of devices with filling bodies has hitherto been impossible.

Figure 1:
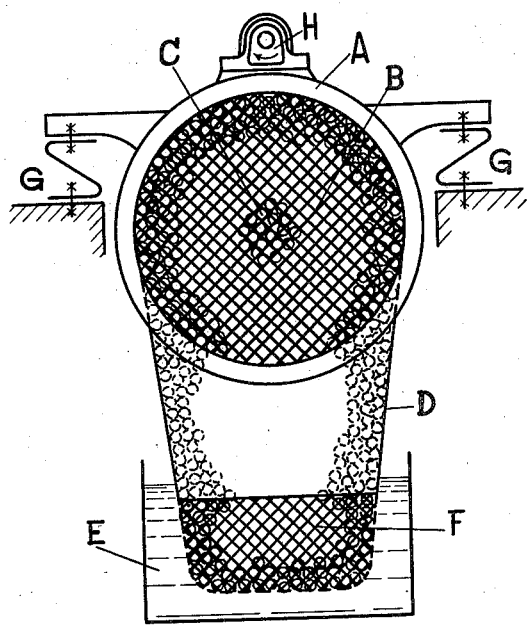
Figure 2:
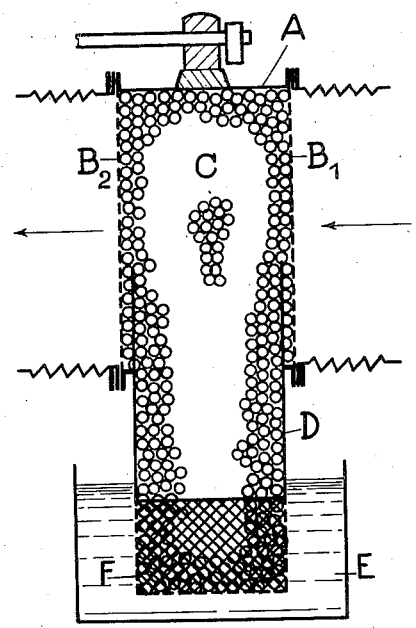

In the accompanying drawing there is illustrated an apparatus suitable for the invention, Fig. 1 is a front view of the device and Fig. 2 is a central sectional view.

The container A filled with filling bodies C is roughly of a pear shaped cross section. The upper part of the container is provided with inlet and outlet openings for the gases to be purified, for instance with circular, lattice plates $B_1$ and $B_2$ through one of which the current of gas to be purified enters the container to leave it through the other. The lower part D of the container A extends into a vessel E filled with the liquid which wets the filling bodies C. The walls F of this immersed portion are also perforated so that the liquid has unhindered access to the filling bodies. The container A is suspended in such a manner that it can be caused to oscillate rapidly by suitable driving means. It may, for instance be suspended, as illustrated by means of the two leaf springs G and at a suitable position on it there may be mounted a shaft carrying an unbalanced mass H the rapid rotation of which imparts a corresponding vibration to the container. It is suitable to apply oscillations of a frequency of about some hundreds to about some thousands per minute. Oscillating points of the system may move in circular to elliptic paths and the amplitude may be some millimeters. The gas to be purified is led to and from the device through pipes the cross section of which corresponds with that of the plates $B_1$ and $B_2$. These pipes are connected with the container A by flexible or elastic connections such as corrugated pipes, leather cuffs or the like which are adapted to the oscillating movements of the system. In the device caused to vibrate in this manner the filling bodies pushed by the walls of the oscillating container A wander in more or less helical entangled paths within the container so that the bodies between the plates $B_1$ and $B_2$ which bodies have been soiled by the impurities of the current of gas continually pass again into the immersed zone F where they are cleaned by their movements and the mutual friction and are moistened with new wetting liquid. During this operation the particles of dirt sink to the bottom of the vessel E. In order to bring the bodies as frequently as possible into contact with the wetting liquid it is advisable that the distance between the immersed part of the container A and the lower border of the plates $B_1$ and $B_2$ should be as short as possible.

In case the current of gas to be purified is under increased or diminished pressure as compared with the surrounding atmosphere, care must be taken by known means, such as deviation, pressure balancing means or the like, that the pressure in the vessel E balances that in the container A, so as to preserve the liquid seal.

A special advantage of the invention is that beyond the simple driving mechanism, no stuffing boxes, packing pieces or the like are necessary; a small apparatus, simple mechanism and low working cost suffice for a continuous purification of the wetting liquid without injury to the filling bodies; furthermore, no channels, dry zone or nests of dirt can be formed in the charge of filling bodies.

We claim:

1. A device for purifying flowing gases which comprises a flexibly mounted container filled with filling bodies, inlet and outlet openings for the gas to be purified mounted at the upper part of the container, a vessel containing wetting liquid arranged below said container, the lower part of said container being perforated and immersed in said wetting liquid, means causing the container to perform circular to elliptic vibrations, whereby the filling bodies are caused to circulate alternately through the current of gas and the wetting liquid entering the lower part of the container.

2. A device for purifying flowing gases which comprises a flexibly mounted container filled with filling bodies, inlet and outlet openings for the gas to be purified mounted at the upper part of the container, a vessel containing wetting liquid arranged below said container, the lower part of said container being perforated and immersed in said wetting liquid, means causing the container to perform circular to elliptic vibrations of a frequency of about some hundreds to about some thousands per minute, whereby the filling bodies are caused to circulate alternately through the current of gas and the wetting liquid entering the lower part of the container.

3. A device for purifying flowing gases which comprises a flexibly mounted container filled with filling bodies, inlet and outlet openings for the gas to be purified mounted at the upper part of the container, a vessel containing wetting liquid arranged below said container, the lower part of said container being perforated and immersed in said wetting liquid, means causing the container to perform circular to elliptic vibrations of an amplitude up to some millimeters, whereby the filling bodies are caused to circulate alternately through the current of gas and the wetting liquid entering the lower part of the container.

SIEGFRIED KIESSKALT.
WALTHER MEJER.